United States Patent
Makke et al.

(10) Patent No.: US 11,965,747 B2
(45) Date of Patent: Apr. 23, 2024

(54) MULTIMODAL ROUTE DATA COLLECTION FOR IMPROVED ROUTING

(71) Applicant: Ford Global Technologies, LLC, Dearborn, MI (US)

(72) Inventors: Omar Makke, Lyon Township, MI (US); Jeremy Lerner, Southfield, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 26 days.

(21) Appl. No.: 17/659,822

(22) Filed: Apr. 19, 2022

(65) Prior Publication Data

US 2023/0332904 A1    Oct. 19, 2023

(51) Int. Cl.
*G01C 21/34* (2006.01)
*G01C 21/36* (2006.01)
*H04W 4/80* (2018.01)

(52) U.S. Cl.
CPC ..... *G01C 21/3423* (2013.01); *G01C 21/3446* (2013.01); *G01C 21/3461* (2013.01); *G01C 21/3469* (2013.01); *G01C 21/3691* (2013.01); *G01C 21/3697* (2013.01); *H04W 4/80* (2018.02)

(58) Field of Classification Search
CPC ............ G01C 21/3469; G01C 21/3423; G01C 21/3446; G01C 21/3461; G01C 21/3691; G01C 21/3697; H04W 4/80
See application file for complete search history.

(56) References Cited

U.S. PATENT DOCUMENTS 8,949,028  B1     2/2015  Klampfl et al.
9,656,123  B2 *   5/2017  Azose ................... G06Q 50/30
10,436,597 B1 *  10/2019  Faaborg ................. G01S 19/13
(Continued)

OTHER PUBLICATIONS

Michelle Akin, P.E., et al., The Use of Connected Vehicle Technology to Facilitate Multimodal Winter Travel (Phase I), Center for Advanced Multimodal Mobility Solutions and Education, Project ID: 2017 Project 09, Aug. 2018, 1-35.
(Continued)

*Primary Examiner* — Yazan A Soofi
*Assistant Examiner* — Naeem Taslim Alam
(74) *Attorney, Agent, or Firm* — Brandon Hicks; Eversheds Sutherland (US) LLP

(57) ABSTRACT

The disclosure is generally directed to systems and methods for a mobile device including transmitting a request by the mobile device for a route that considers transportation modalities and route conditions, the request including location data of the mobile device, receiving a recommended route, the recommended route based on low energy hardware based classification of conditions associated with a plurality of available routes, and receiving a recommended transport modality vehicle and a list of known vehicle identifiers associated with the location data. Low energy wireless signals are received by the mobile device with low energy hardware based classifiers from a mobility vehicle including dedicated hardware including a being a field programmable gate array (FPGA) or an application specific integrated circuit (ASIC) and/or hardware supporting a spiking neural network (SNN), the hardware receiving camera and microphone inputs.

16 Claims, 5 Drawing Sheets

(56) References Cited

U.S. PATENT DOCUMENTS

| | | | |
|---|---|---|---|
| 10,733,460 B2 | 8/2020 | Heck et al. | |
| 11,015,952 B1* | 5/2021 | Lyle | G01C 21/3492 |
| 2008/0084283 A1 | 4/2008 | Kalik | |
| 2009/0192688 A1* | 7/2009 | Padmanabhan | G08G 1/0104 |
| | | | 701/1 |
| 2009/0257622 A1* | 10/2009 | Wolowelsky | G01N 21/3518 |
| | | | 382/103 |
| 2011/0173015 A1 | 7/2011 | Chapman et al. | |
| 2015/0209616 A1* | 7/2015 | Azose | G06Q 50/30 |
| | | | 434/247 |
| 2018/0075754 A1* | 3/2018 | Salter | H04W 4/023 |
| 2018/0188061 A1* | 7/2018 | Yamamoto | G01C 21/3697 |
| 2019/0285423 A1* | 9/2019 | Suzuki | G01C 21/3423 |
| 2020/0065591 A1* | 2/2020 | Ekin | G06V 20/63 |
| 2020/0074849 A1* | 3/2020 | Demisse | G06Q 30/0267 |
| 2020/0151631 A1* | 5/2020 | Lamers | G06Q 10/06311 |
| 2021/0012100 A1* | 1/2021 | Hoffmann | G06N 3/044 |
| 2021/0067119 A1* | 3/2021 | Gadde | G10L 17/00 |
| 2021/0339763 A1* | 11/2021 | Just | G07C 5/0808 |
| 2021/0374412 A1* | 12/2021 | Cerri | G06T 7/90 |
| 2022/0057373 A1* | 2/2022 | Hao | G08G 1/0112 |
| 2022/0074749 A1* | 3/2022 | Bennett | G06Q 30/018 |
| 2022/0205794 A1* | 6/2022 | Friedman | G06V 20/56 |
| 2022/0219599 A1* | 7/2022 | Mochizuki | B60Q 1/507 |
| 2022/0317686 A1* | 10/2022 | Watanabe | H04S 7/302 |
| 2023/0101872 A1* | 3/2023 | Kwon | B60W 30/095 |
| | | | 701/26 |
| 2023/0227059 A1* | 7/2023 | Vogt | H04W 4/40 |
| | | | 340/435 |

OTHER PUBLICATIONS

Michael C. Smith et al., Transportation Systems Management and Operations in Smart Connected Communities, Federal Highway Administration, Report No. FHWA-HOP-19-004, Dec. 2018, 1-35.

* cited by examiner

MULTIMODAL ROUTE DATA COLLECTION FOR IMPROVED ROUTING

BACKGROUND

There are multiple modalities of vehicles capable of receiving route planning data. For example, scooters, walking, bicycles motorcycles, tuck tucks, and the like are all capable of receiving route planning data. Depending on the travel modality an individual happens to be using, the route planning can drastically change. For example, during intense rain, people would prefer to be in an enclosed vehicle and will actively avoid travel modalities that will result in the person getting soaked. After a rainstorm, roads may be wet for a longer duration on a cloudy day than a sunny day. As such, weather can influence a desirable mode of transportation. Other hazards affecting transportation include construction on the road or sidewalks that may impact some but not all modes of transportation. Outside temperature, humidity, and air quality can also affect different modalities of travel differently. A person may choose to avoid a bicycle if the air quality is bad, for example, on a hot day. These factors can change drastically in a large city with large buildings, as the wind patterns change and pollution levels vary. The heat index when compared to a road without trees and to a road with trees which provide shade may also vary depending on the modality of transportation.

Thus, it is desirable to provide solutions that address the need for efficiently collecting and using route data for multiple modalities of transportation.

BRIEF DESCRIPTION OF THE DRAWINGS

A detailed description is set forth below with reference to the accompanying drawings. The use of the same reference numerals may indicate similar or identical items. Various embodiments may utilize elements and/or components other than those illustrated in the drawings, and some elements and/or components may not be present in various embodiments. Elements and/or components in the figures are not necessarily drawn to scale. Throughout this disclosure, depending on the context, singular and plural terminology may be used interchangeably.

DETAILED DESCRIPTION

Overview

Figure 1:
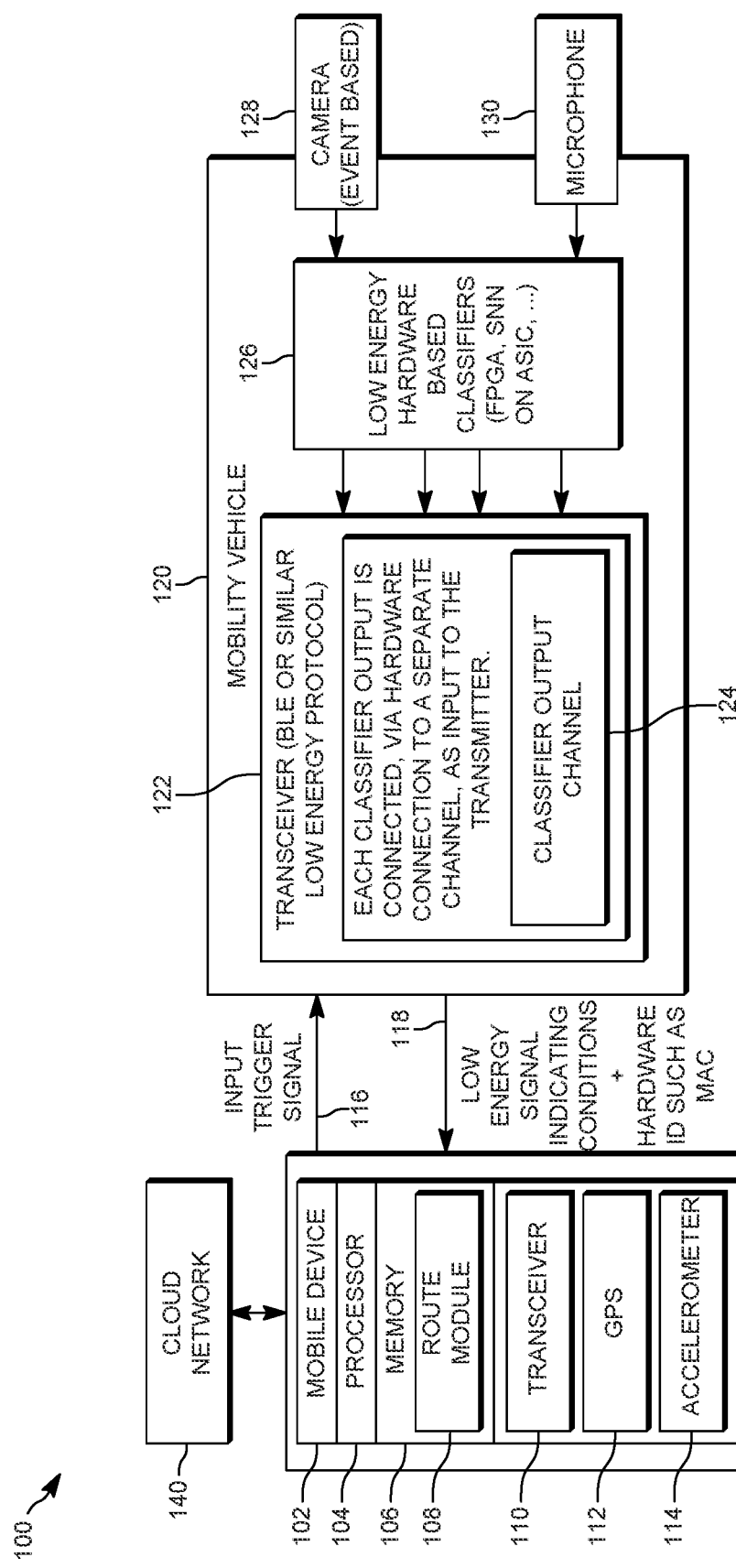
FIG. 1 illustrates an example system that includes a mobility vehicle and a mobile device in accordance with an embodiment of the disclosure.

In terms of a general overview, this disclosure is generally directed to systems and methods for multimodal route data collection for improved routing, including transmitting a request by the mobile device for a route that considers transportation modalities and route conditions, the request including location data of the mobile device. A recommended route is received by the mobile device, the recommended route based on low energy hardware based vision classification of conditions associated with a plurality of available routes. A recommended transport modality vehicle and a list of known vehicle identifiers associated with the location data are provided to the mobile device.

Illustrative Embodiments

The disclosure will be described more fully hereinafter with reference to the accompanying drawings, in which example embodiments of the disclosure are shown. This disclosure may, however, be embodied in many different forms and should not be construed as limited to the example embodiments set forth herein. It will be apparent to persons skilled in the relevant art that various changes in form and detail can be made to various embodiments without departing from the spirit and scope of the present disclosure. Thus, the breadth and scope of the present disclosure should not be limited by any of the above-described example embodiments but should be defined only in accordance with the following claims and their equivalents. The description below has been presented for the purposes of illustration and is not intended to be exhaustive or to be limited to the precise form disclosed. It should be understood that alternative implementations may be used in any combination desired to form additional hybrid implementations of the present disclosure. For example, any of the functionality described with respect to a particular device or component may be performed by another device or component. Furthermore, while specific device characteristics have been described, embodiments of the disclosure may relate to numerous other device characteristics. Further, although embodiments have been described in language specific to structural features and/or methodological acts, it is to be understood that the disclosure is not necessarily limited to the specific features or acts described. Rather, the specific features and acts are disclosed as illustrative forms of implementing the embodiments.

It should also be understood that the word "example" as used herein is intended to be non-exclusionary and non-limiting in nature. Furthermore, certain words and phrases that are used herein should be interpreted as referring to various objects and actions that are generally understood in various forms and equivalencies by persons of ordinary skill in the art. For example, the word "application" or the phrase "software application" as used herein with respect to a nomadic device such as a smartphone, refers to code (software code, typically) that is installed in the nomadic device. The code may be launched and operated via a human machine interface (HMI) such as a touchscreen. The word "action" may be used interchangeably with words such as "operation" and "maneuver" in the disclosure. The word "maneuvering" may be used interchangeably with the word "controlling" in some instances. The word "vehicle" as used in this disclosure can pertain to any one of various types of vehicles such as cars, vans, sports utility vehicles, trucks, electric vehicles, gasoline vehicles, hybrid vehicles, and autonomous vehicles. Phrases such as "automated vehicle," "autonomous vehicle," and "partially autonomous vehicle" as used in this disclosure generally refer to a vehicle that can perform at least some operations without a driver being seated in the vehicle.

FIG. 1 illustrates an example embodiment of system 100 that includes a mobile device 102, such as a cellular phone, network connected device such as an iPad, or wearable network connected device. The mobile device 102 may include a processor 104 coupled to a memory 106, the memory 106 is shown included a route module 108 capable of implementing one or more embodiments of the present disclosure, a transceiver 110, a GPS 112 and an accelerometer 114. GPS 112 and accelerometer 114 are coupled to the route module 108 to provide data. Mobile device 102 wirelessly connects via input trigger signal 116 to receive low energy signal 118 from mobility vehicle 120. Route module 108 may be implemented as a software application, as further explained below, and may implement features of the present disclosure such as collect route data, process low energy signals and generate a route.

Mobility vehicle 120 may be implemented as a scooter, bicycle, vehicle or the like. Mobility vehicle 120 is shown including transceiver 122, which is configured to include a classifier output channel 124. Each classifier output may be connected, via hardware connection to a separate channel, as input to the transceiver. Transceiver 122 is shown coupled to receive low energy hardware based classifiers 126 in different channels as received from camera 128 and microphone 130.

The system may be implemented in a variety of ways and can include various types of devices. For example, the example system can include some components that are a part of the mobility vehicle 120, mobile device 102, and, in some embodiments, other components that are accessible via a communications network 140, shown as a cloud network.

Further, in one or more embodiments, wireless communication data may be communicated via network 140 with cloud based network data communicated to mobile device 102. The wireless communication between mobile device 102 and mobility vehicle 120 may include such as Bluetooth®, Ultra-Wideband (UWB), Wi-Fi, ZigBee®, Li-Fi (light-based communication), audible communication, ultrasonic communication, near field communications (NFC), Bluetooth® low energy (BLE) and the like.

The mobile device 102 may connect via cloud communications network 140. The communications network 140 may include any one network, or a combination of networks, such as a local area network (LAN), a wide area network (WAN), a telephone network, a cellular network, a cable network, a wireless network, and/or private/public networks such as the Internet. For example, the communications network 140 may support communication technologies such as TCP/IP, Bluetooth®, cellular, near field communication (NFC), Wi-Fi, Wi-Fi direct, Li-Fi, acoustic or ultrasonic audio communication, Ultra-Wideband (UWB), machine-to-machine communication, and/or man-to-machine communication.

In one or more embodiments, communications network 140 includes a cellular or Wi-Fi communication link which may include a cloud based network or source for transferring data in accordance with this disclosure.

Figure 2:
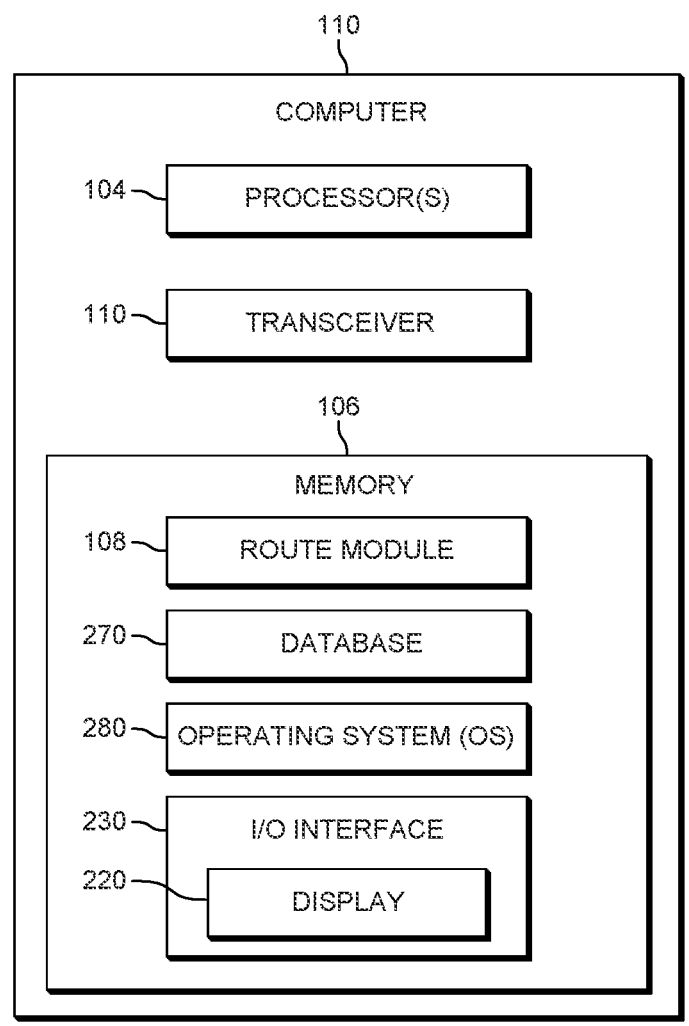
FIG. 2 illustrates exemplary system components within a mobile device in accordance with embodiments of the disclosure.

As shown in FIG. 1, a route module 108 may be a software application that provides a route FIG. 2 illustrates some example functional blocks that may be included in mobile device 102 in accordance with an embodiment of the disclosure. The functional blocks of the mobile device may include processor 104, memory 106, display 220, an input/output (110) interface 230, transceiver 110, route module 108, database 270, and an operating system (OS) 280. The 110 interface 230 may include a touchscreen display 220 having soft keys (graphical icons). The operating system 280 can be any of various kinds of software.

The route module 108 may be a software application that is downloaded into the mobile device 102 from an app store. The route module may be used to carry out various operations such as performing route determinations to identify routes for a user and the like.

The transceiver 110 can include a wireless transmitter and/or a wireless receiver that is used to communicate with mobility vehicle 120 or other mobility vehicles via network 140 or the like. The communications may be carried out by using any of various wireless formats such as, for example, Bluetooth®, Ultra-Wideband (UWB), Wi-Fi, ZigBee®, Li-Fi (light-based communication), audible communication, and ultrasonic communication. The transceiver 110 may be coupled to various components in the mobile device 102, such as, for example, a system for displaying messages, providing warnings, etc. and in some embodiments also be coupled to for communications with other vehicles, for detecting vehicle identifiers and low energy signals indicative of travel conditions.

As one of ordinary skill in the art will appreciate with the benefit of the present disclosure, low energy signals sent wirelessly may be a compressed data file or other type of data formation appropriate for different wireless protocols used for transmission as necessary for system requirements. As used herein, the term "low energy signal" includes without limitation a series of data packets capable of sending event based vision signals and indicators of travel conditions.

The mobile device may be configured to operate in cooperation with the route module 108 to execute various operations for creating a route or amending a route in accordance with the disclosure.

Figure 3:
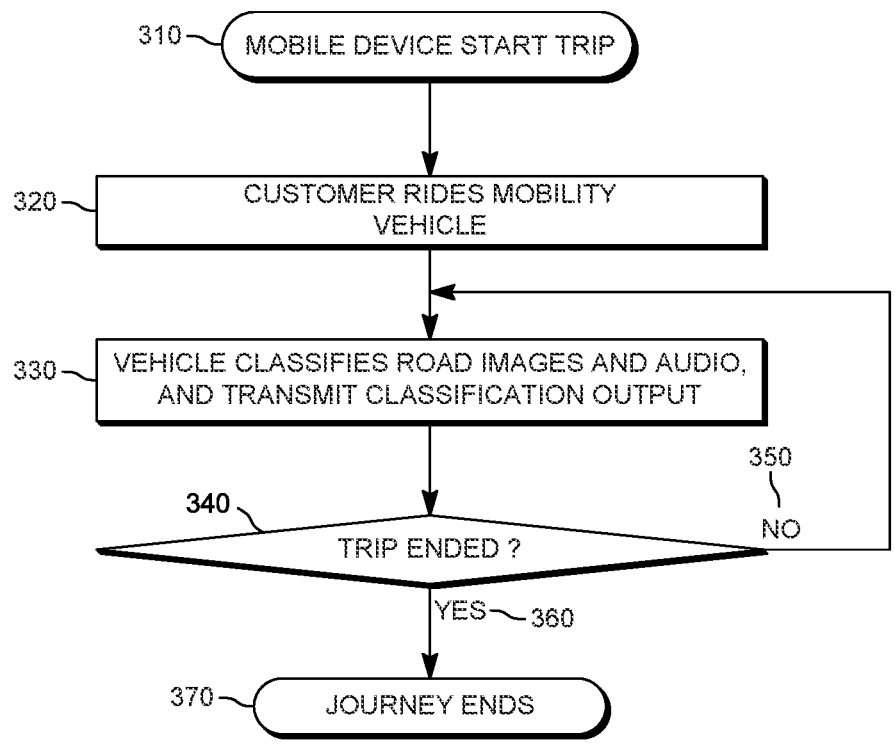
FIG. 3 illustrates an example decision flow diagram of a mobile device providing classification outputs in accordance with an embodiment of the disclosure.

Referring to FIG. 3, a logical flow diagram illustrates a scenario after a route is determined. Block 310 provides for starting a trip within the mobile device 102. Block 320 provides for a customer riding mobility vehicle 120 according to route suggestions. Block 330 provides for receiving classification outputs from mobility vehicle 120, including vehicle 120 classifying road images and audio and transmitting the classification to mobile device 102. Decision block 140 asks if the trip has ended. If not, decision "no" 350 returns to receiving transmitted classification signals from mobility vehicle 120. If so, decision "yes" 360 provides that the journey has ended in block 370.

Figure 4:
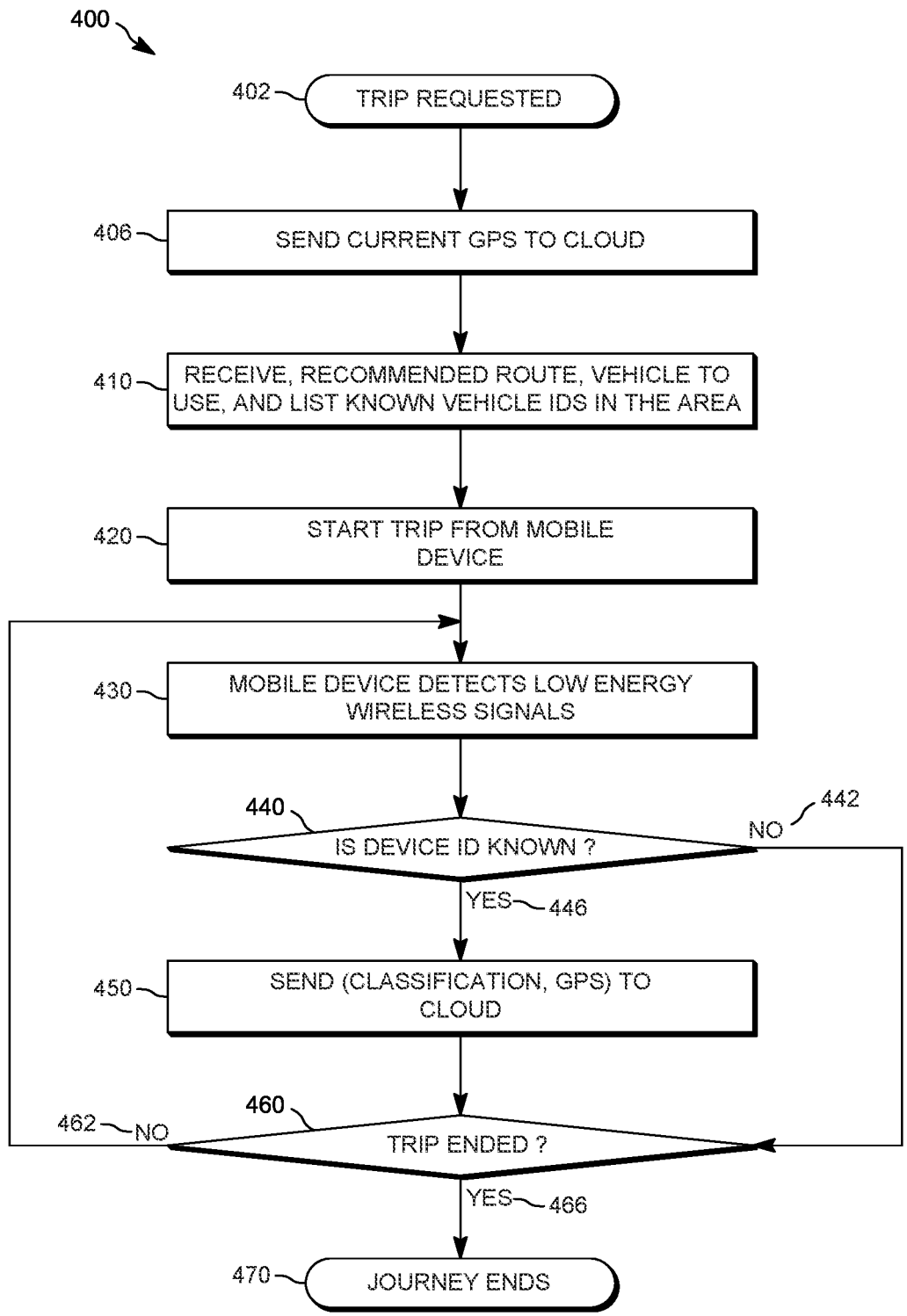
FIG. 4 illustrates an example decision flow diagram of a mobile device requesting mapping for a trip in accordance with an embodiment of the disclosure.

FIG. 4 illustrates an embodiment wherein the route module in mobile device 102 receives data from cloud network 140. As one of ordinary skill in the art will appreciate, different functionalities can be performed in either a cloud server or in mobile device 102, depending on system requirements and processing power required, and data available to be processed. As shown, block 402 provides for requesting a trip. Block 406 provides for sending current location as detected by a global positioning system (GPS) or the like.

Block 410 provides for receiving a recommended route, a vehicle to use and a list of known vehicle identifiers in an area. For example, in one embodiment, route module 108 shown in FIG. 1

Block 420 provides for starting a trip from a mobile device.

Block 430 provides that the mobile device detects low energy wireless signals. Block 440 is a decision block that asks if the device ID from the low energy wireless signal is from a known device. If "No" line 442 asks if the trip is ended at decision block 460. If "yes" line 446 leads to block 450 which provides for sending classification and GPS location to a cloud server, such as via network 140. Decision block 460 determines whether the trip has ended. If "no", line 462 provides for returning to block 430 wherein mobile device 102 detects low energy wireless signals, such as BLE type signals. If "yes", line 466 provides for an end of the journey.

Figure 5:
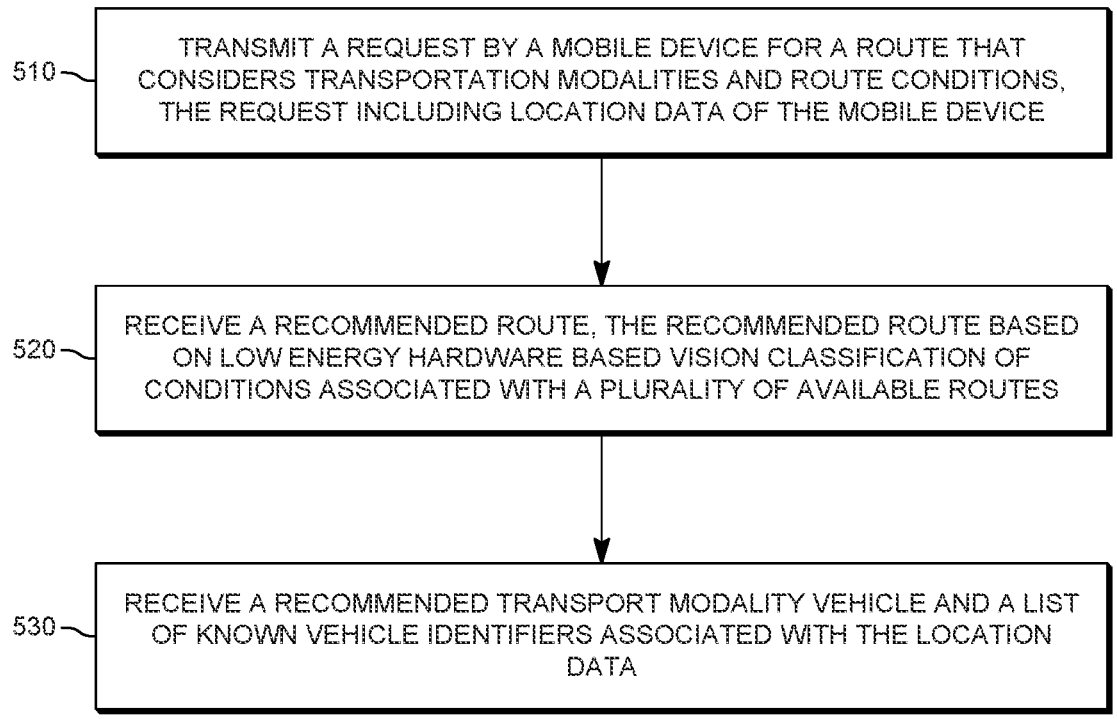
FIG. 5 illustrates a flow diagram of a method in accordance with an embodiment of the disclosure.

Referring to FIG. 5, in accordance with the disclosure, a flow diagram illustrates a method in accordance with an embodiment of the disclosure. As shown, block 510 provides for transmitting a request by the mobile device for a route that considers transportation modalities and route conditions, the request including location data of the mobile device. For example, referring back to FIG. 1, mobile device 102 may send a request using route module 108 to cloud network 140 including GPS data 112. Block 520 provides for receiving a recommended route, the recommended route based on low energy hardware based vision classification of conditions associated with a plurality of available routes. For example, as shown in FIG. 1, mobile device 102 may receive low energy signals and identifiers from mobile vehicle 120 or other mobile vehicles, and include those low energy signals in a transmission to cloud network 140 or, in route module 108, use those low energy signals to generate or alter received route data from cloud network 140. Block 530 provides for receiving a recommended transport modality vehicle and a list of known vehicle identifiers associated with the location data. For example, in FIG. 1, low energy signals received at mobile device 102 may include available mobility vehicles, such as vehicle 120, and may include classifications of conditions related to weather or travel conditions. Route module 108 or a network processor may determine a recommended transport modality vehicle based on the weather conditions. For example, if a weather condition is rainy as indicated by an event based low energy signal, and a mobility vehicle is a scooter, a simple ANDing logic within route module 108 or a network server, may be used to reject the scooter as an option.

In one or more embodiments, the receiving a recommended transport modality vehicle and a list of known vehicle identifiers associated with the location data may be based on a low energy hardware based vision classification is based on a convolutional neural network, a spiked neural network (SNN), an XNOR network, a ternary network implemented on a field programmable gate array (FPGA), or an application specific integrated circuit (ASIC). For example, as shown in FIG. 1 mobility vehicle 120 may include an ASIC or FPGA connected to event based condition detectors such as a camera and a microphone, such as camera 128 and microphone 130 connected to hardware 126. Importantly, mobile vehicle 120 may implement a spiked neural network in hardware and transmit via hardware connection to transceiver 122 to mobile device 102.

In one or more embodiments, the input for the low energy hardware 126 to create vision classification is from a camera, such as camera 128, and is based on events. Hardware 126 analyzes conditions including air quality, rain, wet roads, construction zones, and pedestrians.

In one or more embodiments, the input for the low energy hardware 126 to create classifications include input from microphone 130 including horn signals, vehicle noise indicative of traffic flow, and thunder indicative of inclement weather.

In one or more embodiments the with low energy hardware based classifiers are created in hardware 126, the hardware being a field programmable gate array (FPGA) or an application specific integrated circuit (ASIC) and/or hardware supporting a spiking neural network (SNN), the hardware receiving camera and microphone inputs. In one or more embodiments, the low energy hardware based classifiers are then transmitted according to a Bluetooth low energy (BLE) protocol or a low energy protocol.

After the low energy wireless signals are transmitted to mobile device 102, routing module 108 may then determine which mobility vehicle is appropriate for a route received from cloud network 140. For example, if multiple mobility vehicles are detected, then different classifiers and vehicle identifiers are received at mobile device 102. The transportation modality of choice available to a user of mobile device 102 may include input from cloud network regarding travel conditions as well. For example, if route module is an add-on to a mapping program, the route module may take into account road closures and events near the location of the mobile device. Thus, a choice of transportation modalities may include walking, a scooter, an electric vehicle, including one or more of an autonomous or semiautonomous vehicle, a car, a motorcycle, a bicycle or electric bicycle, a skateboard or electric skateboard.

Figure 6:
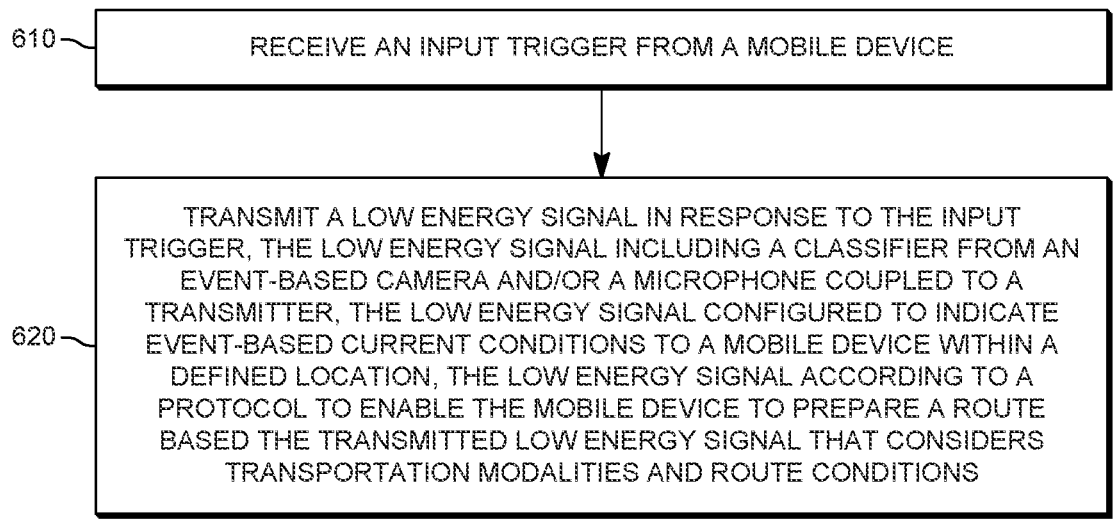
FIG. 6 illustrates a flow diagram of a method in accordance with an embodiment of the disclosure.

Referring now to FIG. 6, a flow diagram illustrates a method for a mobility vehicle according to one or more embodiments. The mobility vehicle may be a transportation modality capable of including event based and hardware implemented cameras and/or microphones, such as a scooter, a bicycle or a car, for example. As shown block 610 provides for receiving an input trigger from a mobile device. For example, as shown in FIG. 1, mobile device 102 may request vehicles nearby for purposes of determining a route on an appropriate vehicle.

Block 620 provides for transmitting a low energy signal in response to the input trigger, the low energy signal including a classifier from an event based camera and/or a microphone coupled to a transmitter, the low energy signal configured to indicate event based current conditions to a mobile device within a defined location, the low energy signal according to a protocol to enable the mobile device to prepare a route based the transmitted low energy signal that considers transportation modalities and route conditions. For example, as shown in FIG. 1, mobility vehicle 120 includes low energy hardware 126 that generates classifiers. The transmitted signals 118 received by mobile device 102 enable route module 108 to generate a route and determine an appropriate transportation modality.

In one or more embodiments, the low energy signal enables the mobile device to update local conditions near the mobile device based on known vehicle identifiers and low energy hardware based vision classification of conditions. For example, mobility vehicle 120 may generate the low energy signals as low energy hardware based classification signals based on a convolutional neural network, a spiked neural network (SNN), an XNOR network, a ternary network implemented on a field programmable gate array (FPGA), or an application specific integrated circuit (ASIC) that are generated based on signals received from a connected event based camera and microphone detecting conditions including air quality, weather, wet roads, construction zones, and pedestrians. Thus, the low energy hardware based classification signals include event based microphone signals indicative of horn signals, vehicle noise indicative of traffic flow, and thunder indicative of inclement weather.

In the above disclosure, reference has been made to the accompanying drawings, which form a part hereof, which illustrate specific implementations in which the present disclosure may be practiced. It is understood that other implementations may be utilized, and structural changes may be made without departing from the scope of the present disclosure. References in the specification to "one embodiment," "an embodiment," "an example embodiment," "an example embodiment," "example implementation," etc., indicate that the embodiment or implementation described may include a particular feature, structure, or characteristic, but every embodiment or implementation may not necessarily include the particular feature, structure, or characteristic. Moreover, such phrases are not necessarily referring to the same embodiment or implementation. Further, when a particular feature, structure, or characteristic is described in connection with an embodiment or implementation, one skilled in the art will recognize such feature, structure, or characteristic in connection with other embodiments or implementations whether or not explicitly described. For example, various features, aspects, and actions described above with respect to an autonomous parking maneuver are applicable to various other autonomous maneuvers and must be interpreted accordingly.

Implementations of the systems, apparatuses, devices, and methods disclosed herein may comprise or utilize one or more devices that include hardware, such as, for example, one or more processors and system memory, as discussed herein. An implementation of the devices, systems, and methods disclosed herein may communicate over a computer network. A "network" is defined as one or more data links that enable the transport of electronic data between computer systems and/or modules and/or other electronic devices. When information is transferred or provided over a network or another communications connection (either hardwired, wireless, or any combination of hardwired or wireless) to a computer, the computer properly views the connection as a transmission medium. Transmission media can include a network and/or data links, which can be used to carry desired program code means in the form of computer-executable instructions or data structures and which can be accessed by a general purpose or special purpose computer. Combinations of the above should also be included within the scope of non-transitory computer-readable media.

Computer-executable instructions comprise, for example, instructions and data which, when executed at a processor, cause the processor to perform a certain function or group of functions. The computer-executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

A memory device can include any one memory element or a combination of volatile memory elements (e.g., random access memory (RAM, such as DRAM, SRAM, SDRAM, etc.)) and non-volatile memory elements (e.g., ROM, hard drive, tape, CDROM, etc.). Moreover, the memory device may incorporate electronic, magnetic, optical, and/or other types of storage media. In the context of this document, a "non-transitory computer-readable medium" can be, for example but not limited to, an electronic, magnetic, optical, electromagnetic, infrared, or semiconductor system, apparatus, or device. More specific examples (a non-exhaustive list) of the computer-readable medium would include the following: a portable computer diskette (magnetic), a random-access memory (RAM) (electronic), a read-only memory (ROM) (electronic), an erasable programmable read-only memory (EPROM, EEPROM, or Flash memory) (electronic), and a portable compact disc read-only memory (CD ROM) (optical). Note that the computer-readable medium could even be paper or another suitable medium upon which the program is printed, since the program can be electronically captured, for instance, via optical scanning of the paper or other medium, then compiled, interpreted or otherwise processed in a suitable manner if necessary, and then stored in a computer memory.

Those skilled in the art will appreciate that the present disclosure may be practiced in network computing environments with many types of computer system configurations, including in-dash vehicle computers, personal computers, desktop computers, laptop computers, message processors, nomadic devices, multi-processor systems, microprocessor-based or programmable consumer electronics, network PCs, minicomputers, mainframe computers, mobile telephones, PDAs, tablets, pagers, routers, switches, various storage devices, and the like. The disclosure may also be practiced in distributed system environments where local and remote computer systems, which are linked (either by hardwired data links, wireless data links, or by any combination of hardwired and wireless data links) through a network, both perform tasks. In a distributed system environment, program modules may be located in both the local and remote memory storage devices.

Further, where appropriate, the functions described herein can be performed in one or more of hardware, software, firmware, digital components, or analog components. For example, one or more application specific integrated circuits (ASICs) can be programmed to carry out one or more of the systems and procedures described herein. Certain terms are used throughout the description, and claims refer to particular system components. As one skilled in the art will appreciate, components may be referred to by different names. This document does not intend to distinguish between components that differ in name, but not function.

At least some embodiments of the present disclosure have been directed to computer program products comprising such logic (e.g., in the form of software) stored on any computer-usable medium. Such software, when executed in one or more data processing devices, causes a device to operate as described herein.

While various embodiments of the present disclosure have been described above, it should be understood that they have been presented by way of example only, and not limitation. It will be apparent to persons skilled in the relevant art that various changes in form and detail can be made therein without departing from the spirit and scope of the present disclosure. Thus, the breadth and scope of the present disclosure should not be limited by any of the above described example embodiments but should be defined only in accordance with the following claims and their equivalents. The foregoing description has been presented for the purposes of illustration and description. It is not intended to be exhaustive or to limit the present disclosure to the precise form disclosed. Many modifications and variations are possible in light of the above teaching. Further, it should be noted that any or all of the aforementioned alternate implementations may be used in any combination desired to form additional hybrid implementations of the present disclosure. For example, any of the functionality described with respect to a particular device or component may be performed by another device or component. Further, while specific device characteristics have been described, embodiments of the disclosure may relate to numerous other device characteristics. Further, although embodiments have been described in language specific to structural features and/or methodological acts, it is to be understood that the disclosure is not necessarily limited to the specific features or acts described. Rather, the specific features and acts are disclosed as illustrative forms of implementing the embodiments. Conditional language, such as, among others, "can," "could," "might," or "may," unless specifically stated otherwise, or otherwise understood within the context as used, is generally intended to convey that certain embodiments could include, while other embodiments may not include, certain features, elements, and/or steps. Thus, such conditional language is not generally intended to imply that features, elements, and/or steps are in any way required for one or more embodiments.

That which is claimed is:

1. A method for a mobile device comprising:
transmitting, via a processor of the mobile device, a request for a route that considers transportation modalities and route conditions, the request including location data of the mobile device;
receiving, by the mobile device, a low energy wireless signal from a mobile vehicle, wherein the low energy wireless signal includes information related to air quality, weather, wet roads, construction zones, and pedestrians, wherein the information is determined by the mobile vehicle using an event-based camera or a microphone of the mobile vehicle;
transmitting, by the mobile device, the information to a remote server; and
receiving, by the mobile device and from the remote server, a recommended route, a recommended transport modality vehicle, and a list of known vehicle identifiers associated with the location data.

2. The method of claim 1, wherein the list of known vehicle identifiers associated with the location data are received as low energy wireless signals.

3. The method of claim 1, wherein receiving the recommended route includes receiving updated recommendations based on the list of received known vehicle identifiers and low energy hardware based vision classification of conditions associated with a plurality of available routes.

4. The method of claim 2, wherein the information includes horn signals, vehicle noise indicative of traffic flow, and thunder indicative of inclement weather.

5. The method of claim 1, wherein the low energy wireless signal is received by the mobile device with low energy hardware based classifiers from a mobility vehicle including dedicated hardware including a field programmable gate array (FPGA), an application specific integrated circuit (ASIC), and/or hardware supporting a spiking neural network (SNN), the dedicated hardware receiving camera and microphone inputs.

6. The method of claim 5, wherein the low energy wireless signal is a Bluetooth low energy (BLE) protocol or another low energy protocol.

7. The method of claim 1, wherein the low energy wireless signal is an event based triggered signal.

8. The method of claim 1, wherein the transportation modalities include one or more of walking, a scooter, an electric vehicle, including one or more of an autonomous or semiautonomous vehicle, a car, a motorcycle, a bicycle or electric bicycle, a skateboard or electric skateboard.

9. A system comprising:
a memory that stores computer-executable instructions; and
a processor configured to access the memory and execute the computer-executable instructions to:
receive a request from a mobile device for a route that considers transportation modalities and route conditions, the request including location data of the mobile device;
receive, from the mobile device, information related to air quality, weather, wet roads, construction zones, and pedestrians, wherein the information is determined by a mobile vehicle using an event-based camera or a microphone of the mobile vehicle, and wherein the information is received by the mobile device from the mobile vehicle via a low energy wireless signal; and
transmit, to the mobile device, a recommended route, a recommended transport modality vehicle, and a list of known vehicle identifiers associated with the location data.

10. The system of claim 9, wherein the system is implemented in a cloud network coupled to the mobile device.

11. The system of claim 9, wherein the recommended transport modality vehicle includes one or more of walking, a scooter, an electric vehicle, including one or more of an autonomous or semiautonomous vehicle, a car, a motorcycle, a bicycle or electric bicycle, a skateboard or an electric skateboard.

12. A method for a mobility vehicle comprising:
capturing, by the mobility vehicle and using an event based camera or a microphone, information including air quality, weather, wet roads, construction zones, and pedestrians in a defined location;
receiving an input trigger from a mobile device within the defined location; and
transmitting, by the mobility vehicle and in response to the input trigger, a low energy signal to the mobile device, the low energy signal including the information and providing an indication of event based current conditions within the defined location, the information used to generate a route that considers transportation modalities and route conditions in order to select a recommended transport modality.

13. The method of claim 12, wherein the low energy signal is a Bluetooth low energy (BLE) signal.

14. The method of claim 12, wherein the low energy signal includes low energy hardware based classifiers, wherein hardware associated with the low energy hardware based classifiers is a field programmable gate array (FPGA) or an application specific integrated circuit (ASIC) and/or hardware supporting a spiking neural network (SNN), the hardware coupled to receive camera and microphone inputs.

15. The method of claim 12, wherein the low energy signal enables the mobile device to update local conditions near the mobile device based on known vehicle identifiers and low energy hardware based vision classification of conditions.

16. The method of claim 14, wherein low energy hardware based classification signals include event based microphone signals indicative of horn signals, vehicle noise indicative of traffic flow, and thunder indicative of inclement weather.

* * * * *